United States Patent [19]

Dowling et al.

[11] 4,152,134

[45] May 1, 1979

[54] ELECTRONIC CONTROL SYSTEM FOR AN INDIVIDUAL SECTION GLASSWARE FORMING MACHINE

[75] Inventors: W. Thomas Dowling, Sylvania; Daniel S. Farkas, Toledo, both of Ohio

[73] Assignee: Owens-Illinois, Inc., Toledo, Ohio

[21] Appl. No.: 866,086

[22] Filed: Dec. 30, 1977

[51] Int. Cl.² ............................................. C03B 9/40
[52] U.S. Cl. ........................................ 65/163; 65/29; 65/158; 65/159; 65/164; 65/DIG. 13; 364/473
[58] Field of Search ................. 65/29, 158, 159, 160, 65/163, 164, DIG. 13; 364/473, 476

[56] References Cited

U.S. PATENT DOCUMENTS

| 3,762,907 | 10/1973 | Quinn et al. | 65/DIG. 13 |
| 3,905,793 | 9/1975 | Croughwell | 65/163 |
| 4,007,028 | 2/1977 | Bublitz et al. | 65/163 |
| 4,108,623 | 8/1978 | Cardenas-Franco | 65/163 |

OTHER PUBLICATIONS

Electronic Timing of Automatic Glass-Blowing Machines by Kwiatkowski, et al., IEEE Transactions on Industrial Applications, vol. 1A-12, No. 2, Mar./Apr. 1976, pp. 165-171.

Primary Examiner—Arthur D. Kellogg
Attorney, Agent, or Firm—D. H. Wilson; M. E. Click

[57] ABSTRACT

A control system for a glassware forming machine which has a plurality of individual machine sections each capable of individually forming glassware articles. The control system includes a machine supervisory control means connected to a separate section control means for each of the individual sections and to a data storage means. The machine supervisory control means loads each section control means with a control program and timing data from the storage means for forming a specific article of glassware. As the individual sections form the glassware under the control of the section control means, the machine operator can change any of the timing data for each individual section. The machine supervisory control means obtains the current timing data from each of the section control means at predetermined intervals and sends it to the storage means. Thus, in the case of a power failure, for example, the current timing data is available and can be loaded into the section control means to resume operation.

19 Claims, 13 Drawing Figures

ELECTRONIC CONTROL SYSTEM FOR AN INDIVIDUAL SECTION GLASSWARE FORMING MACHINE

BACKGROUND OF THE INVENTION

1. Field of the Invention

The present invention relates generally to machines for forming glassware articles from gobs of molten glass and in particular to electronically controlled individual section glassware forming machines.

2. Description of the Prior Art

The individual section or IS glassware forming machine is well know and includes a plurality of sections each having means for forming glassware articles in a timed, predetermined sequence of steps. Typically, the sections are fed from a single source of molten glass which forms gobs of the molten glass which gobs are distributed to the individual sections in an ordered sequence. The sections are operated in synchronism at a relative phase difference such that one section is receiving a gob while another section is delivering a finished glassware article to a conveyor and one or more other sections are performing various ones of the intermediate forming steps.

The forming means in each section are typically operated from pneumatic motors or actuators. In early prior art machines, the pneumatic motors were controlled by a valve block which in turn was controlled by a timing drum for each section driven from a line shaft which synchronized all parts of the machine. One of the limitations of the timing drum was the difficulty of adjusting the timing during the operation of the machine. One solution to this problem was to replace all the timing drums with an electronic control means. The electronic control means included a master unit which was responsive to a clock pulse generator and a reset pulse generator driven by the line shaft. The master unit generated reset signals to an individual control circuit for each of the individual sections to synchronize the operation of the individual circuits. Each individual circuit included a pulse counter responsive to the clock pulses and the master unit generated reset pulses for counting the degrees of the section cycle. Each individual circuit included forty-eight, three-decade thumbwheel switches for setting the degrees of rotation of the machine thereon. Thus, each particular function of the glassware forming cycle was controlled by one of the thumbwheel switches. Such a control system is disclosed in U.S. Pat. No. 3,762,907.

The previously described electronic control system utilized discrete components in its counter and gating circuitry. In a later prior art control apparatus, a digital computer with a memory and associated program storage was utilized. Not only did such a control circuit provide a means for automatically changing the timing values of the functions without the manual resetting of thumb-wheel switches, but such a circuit also provided a means for programming events, groups of related functions, in accordance with certain boundary event timings. The computer generated control signals through an interface circuit to actuate solenoid controlled valve blocks. Such a control system is disclosed in U.S. Pat. No. 3,905,793.

SUMMARY OF THE INVENTION

The present invention concerns an electronic control system for an individual section glassware forming machine. The machine has means for forming gobs of molten glass, a plurality of individual sections for forming glassware articles, and means for feeding the gobs of molten glass to the individual sections. Each of the individual sections includes forming means for forming the glassware articles in a series of predetermined forming steps in response to a plurality of control signals. The machine also includes an electronic control means for generating the control signals.

The control means has a machine supervisory computer connected to a plurality of individual section computers, one for each of the individual sections of the machine. The machine supervisory computer is also connected to an input/output device and a data storage device. The data storage device stores control programs for the machine supervisory computer and both control programs and job histories for the individual section computers. The machine supervisory computer loads the individual section computers with the control programs and job histories for forming a particular glassware article. Each individual section computer then generates the control signals required to actuate the forming means of the associated section. A section operator console is provided at each section to enable the machine operator to change the timing data for any of the forming functions. The section operator console is connected to the individual section computer which reads the timing change and replaces the corresponding previous timing data. At predetermined intervals, the machine supervisory computer reads the current timing data from each of the individual section computers and stores this current data in the data storage device. Thus, the current timing data for each individual section is always available for the next time that job is run or should there be a power failure which destroys the contents of the volatile memory in the individual section computer. In response to the restoration of power after a power failure, the machine supervisory computer automatically reloads the individual section computers with the timing data from the data storage device.

The machine supervisory computer is also connected to a bottle reject control panel and a bottle reject station. Through the control panel, the machine operator can designate bottles to be rejected by section and mold and number of machine cycles. The machine supervisory computer responds to the control panel generated information to generate control signals to the reject station when the machine reaches the corresponding position in the machine cycle.

It is an object of the present invention to increase the efficiency and accuracy of individual section glassware forming machines.

It is another object of the present invention to maintain current timing data for the individual sections of a glassware forming machine.

It is a further object of the present invention to facilitate the change from job to job for an individual section glassware forming machine.

DESCRIPTION OF THE PREFERRED EMBODIMENT

Figure 1:
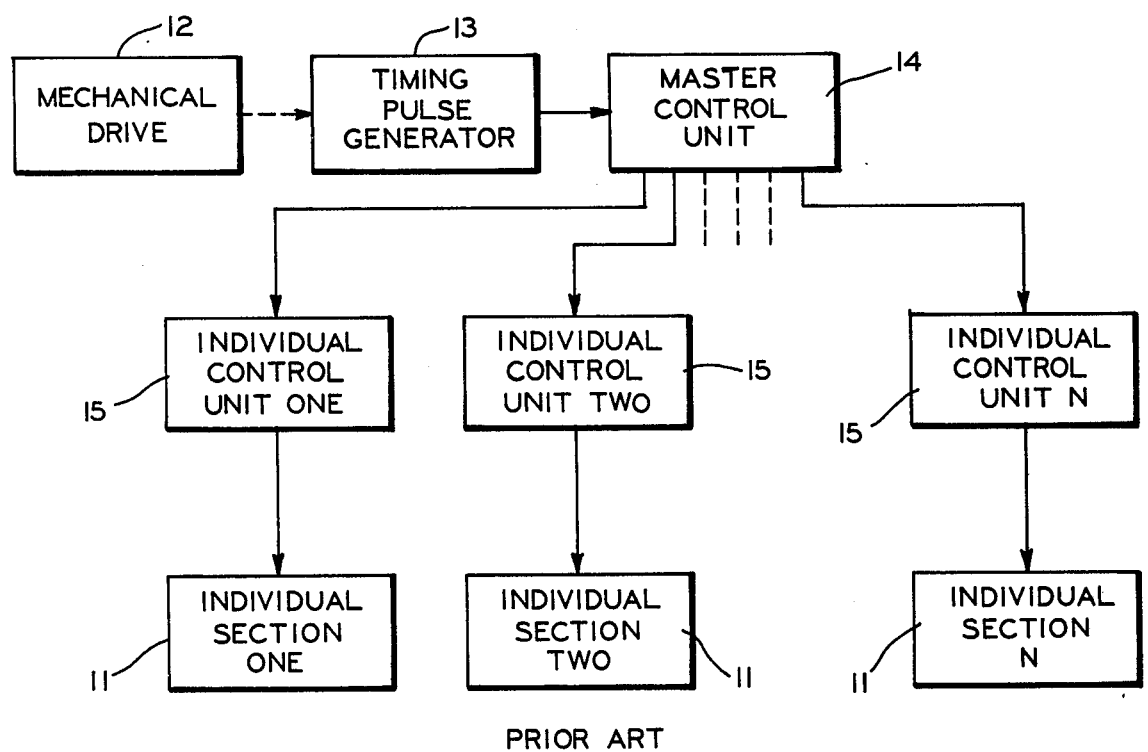
FIG. 1 is a block diagram of a prior art, dedicated, discrete component electronic control system and associated individual section glassware forming machine.

There is shown in FIG. 1 a prior art glassware forming machine and associated electronic control system which is more fully described in U.S. Pat. No. 3,762,907. The forming machine includes a plurality of individual sections 11, numbered from one through N, which sections are identical. A mechanical drive 12 is representative of one or more such drives which are utilized to operate means (not shown) for forming molten gobs of glass, distributing the gobs to the individual sections and conveying the formed glassware away from the machine all at predetermined synchronized rates. The mechanical drive 12 is mechanically coupled to a timing pulse generator 13 which represents a pulse generator for generating one timing pulse for each degree of revolution of the drive shaft of the mechanical drive 12 and a reset pulse generator for generating one pulse for each revolution of the drive shaft of the mechanical drive.

The timing pulses and reset pulses generated by the timing pulse generator 13 are applied to a master control unit 14. The master control unit 14 includes a master counter (not shown) for counting the timing pulses to generate a count total representing the rotational position of the machine in the 360° machine cycle. The master control unit also includes a master synchronization circuit which is responsive to the reset pulses for resetting the master counter after 360 pulses have been counted representing a full cycle of the machine. The digital count total of the master counter is applied to a gating circuit which generates selected count signals to a plurality of section firing order control switches. For example, in a six section machine, the gating board would be preset to generate selected count signals representing 60°, 120°, 180°, 240° and 300° to each section firing order control switch. Each section firing order control switch also receives the reset pulse which is generated at 360° and each switch is preset to respond to one of the selected count signals or the reset signal to generate a reset counter signal to an associated individual control unit 15.

Each individual control unit 15 includes a sync board which is responsive to the reset counter signal generated by the associated section firing order control switch for generating a section reset signal. A section counter counts the timing pulses generated by the timing pulse generator 13 and is reset by the section reset signal after every three hundred sixty pulses. The section counter generates a count total representing the rotational position of the individual section in the machine cycle, all but one of the section counter count totals being offset from the count total of the master counter. Each individual section includes forty-eight thumbwheel switches which are connected in parallel to the output of the section counter. Each thumbwheel switch generates a gating signal when the section counter count total reaches the number to which that individual switch is set. The gating signal from each thumbwheel switch is applied to a function control board which responds by generating an output signal to actuate a solenoid winding for operating an associated valve in a valve block.

Thus, each individual section 11 has a cycle time equal to the cycle time for the machine but the individual section cycle times are equally distributed through the machine cycle. The timing and the order of the functions for each individual section are set on forty-eight thumbwheel switches which are responsive to a count total accumulated by a section counter which is reset at the end of each individual section cycle by the master control unit. The master control unit resets the section counters at predetermined intervals to offset the individual section cycles with respect to one another.

Figure 2:
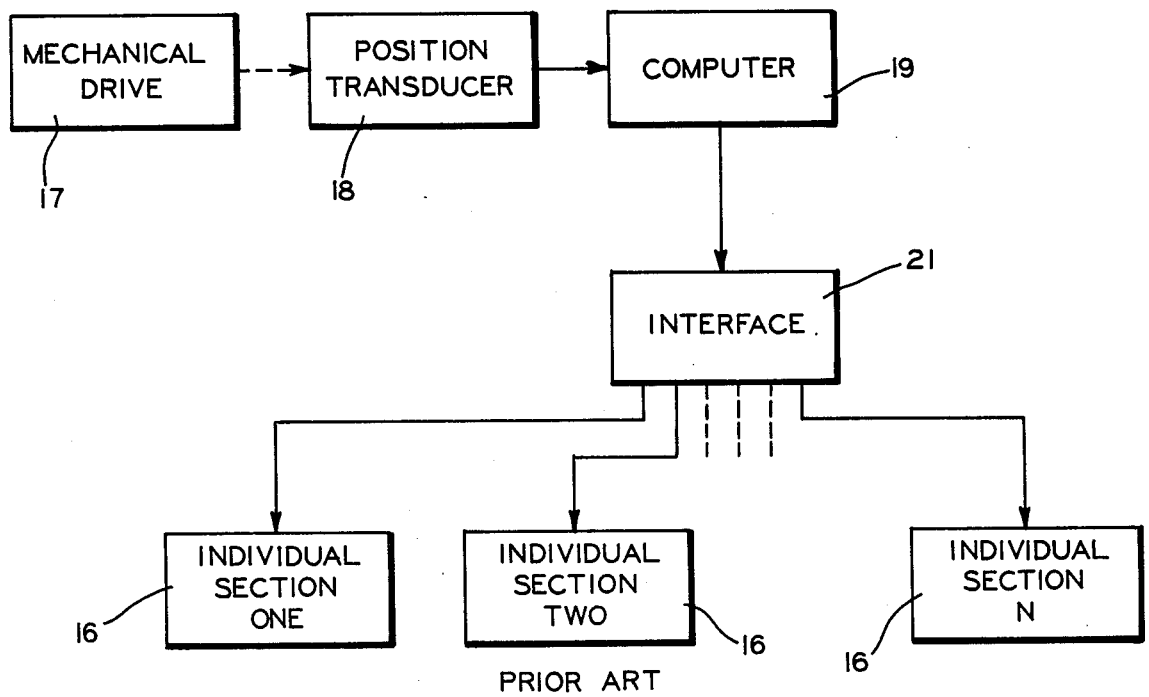
FIG. 2 is a block diagram of a prior art computer controlled individual section glassware forming machine.

There is shown in FIG. 2 a prior art glassware forming machine and associated electronic control system which is more fully explained in U.S. Pat. No. 4,007,028. The forming machine includes a plurality of individual sections 16, numbered from one to N, which sections are identical. A mechanical drive 17 is representative of one or more such drives which are utilized to operate means (not shown) for forming gobs of molten glass, distributing the gobs to the individual sections and conveying the formed glassware away from the machine all at predetermined, synchronized rates. The mechanical drive 17 is mechanically coupled to a position transducer 18 for generating an output signal representing the position of the mechanical drive and, therefore, the rotational position of the machine. For example, the mechanical drive 17 and the position transducer 18 can be associated with the gob forming means or the gob distributor (neither shown).

A computer 19 is programmed to generate control signals through an interface 21 to the individual sections to actuate solenoid operated valves in valve blocks (not shown). The computer 19 stores a program which determines the timing and the order of performing the various functions in each individual section. The computer then compares the position transducer signals with the position value for the next function to be performed in the order for generating the proper control signal. An operator control panel (not shown) is provided for displaying the values of each of the functions for each of the individual sections. The control panel also has switch means for changing any of the function values to a new value when desired.

Figure 3:
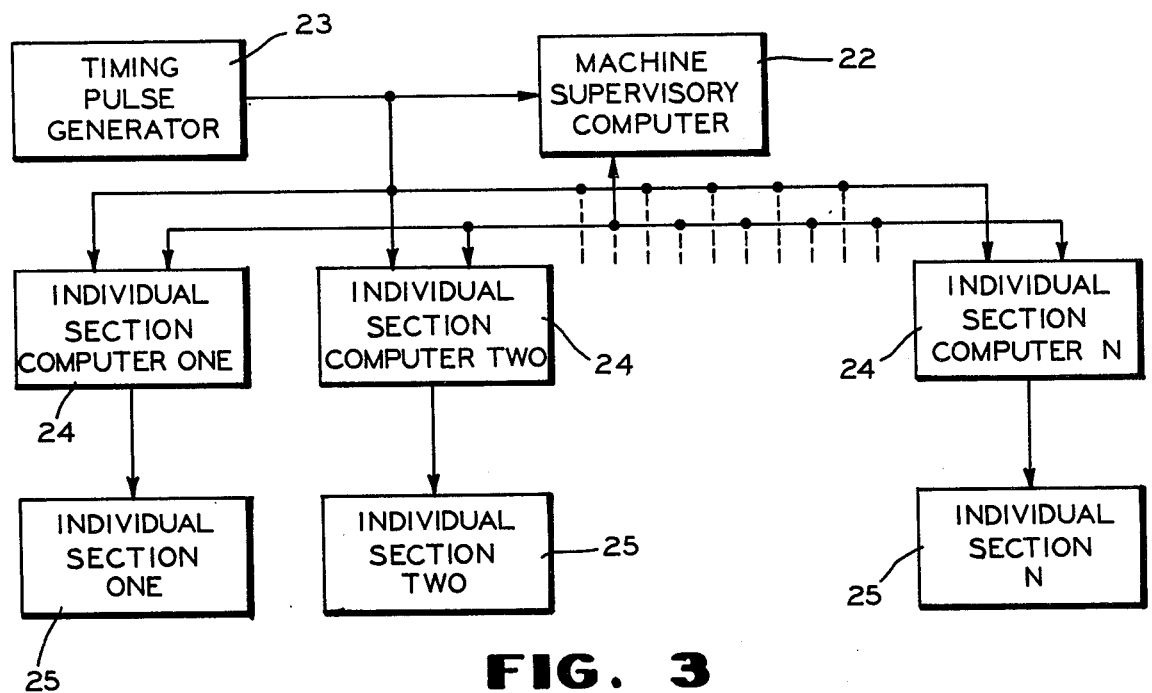
FIG. 3 is a simplified block diagram of an individual section glassware forming machine and a control system therefor according to the present invention.

Both of the prior art control systems described above utilize a master control or computer to determine the timing of the individual sections and the offset between the sections. In FIG. 3, there is shown a block diagram of an individual section glassware forming machine and control therefor according to the present invention. A machine supervisory computer 22 receives a train of timing pulses from a timing pulse generator 23 to establish the timing for the machine cycle. The generator 23 typically can be a shaft encoder or pulse generator of the type disclosed in U.S. patent applications Ser. No. 856,387 in the names of Daniel S. Farkas and Philip D. Perry and Ser. No. 860,934 in the names of Daniel S. Farkas and Erwin M. Ferenczy, both assigned to the assignee of the present invention.

The machine supervisory computer 22 is connected to a plurality of individual section computers 24, one through N, each of which is connected to an associated one of a plurality of individual sections 25, one through N, of the glassware forming machine. Initially, the machine supervisory computer 22 loads each individual section computer 24 with a control program and timing data for controlling the associated individual section. Thereafter, each individual section computer 24 generates control signals in response to the control program and timing pulses from the timing pulse generator 23 to a value block (not shown) in the associated individual section 25 to control the glassware forming cycle. The machine supervisory computer 22 periodically receives current timing data from each of the individual section computers 24 which data can be stored for use the next time that particular type of glassware is to be formed or in the event that one of the individual sections is shut down for any reason.

Figure 4:
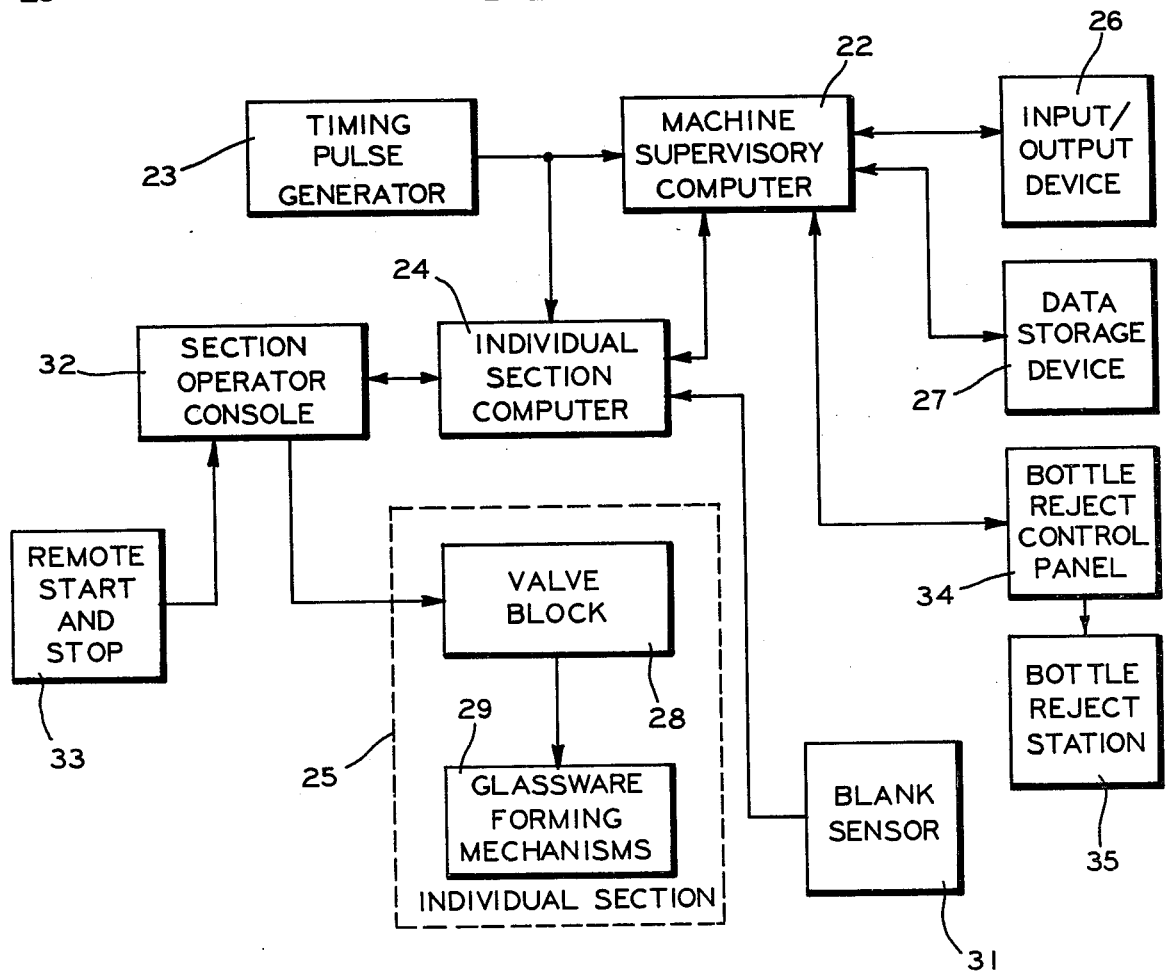
FIG. 4 is a more detailed block diagram of the control system and one of the individual sections of FIG. 3.

FIG. 4 is a more detailed block diagram of the control system and one of the individual sections of FIG. 3. The timing pulse generator 23 generates a train of timing pulses to the machine supervisory computer (MSC) 22 and the individual section computer (ISC) 24. An input/output device 26 and a data storage device 27 are both connected to the machine supervisory computer 22 by a pair of bidirectional lines. The machine supervisory computer 22 and the individual section computer 24 typically can be LSI-11 computers, the input/output device 26 typically can be a LA36 DECwriter teleprinter and the data storage device typically can be a RXV11 Floppy Disk Drive all manufactured by the Digital Equipment Corporation of Maynard, Mass.

The timing pulse generator 23 generates a clock signal to the MSC 22 and the ISC 24 which signal provides a reference for timing the machine cycle and the sequence of steps to be performed by the ISC. Typically, machine timing is expressed in degrees and a machine cycle is 360° in length. Thus 360 clock pulses or some multiple thereof comprise one machine cycle. The cycle for each individual section is also 360° but the cycles for all of the sections can be offset from the start of the machine cycle by a different number of degrees to compensate for the difference in gob delivery time to each section. The timing pulse generator also generates a reset signal after 360° of clock pulses which reset signal is utilized by the MSC and the ISC to define the end and beginning of successive machine cycles.

The MSC 22 is used to load the control programs and timing data into the ISC 24 from the data storage device 27. An operator uses the I/O device 26 to select the particular timing data which is to be loaded into the ISC. It should be noted that each ISC has a separate set of timing data for the particular individual section which it controls.

The ISC 24 generates control signals to a valve block 28 through a section operator console discussed below. The valve block is connected to a plurality of glassware forming mechanisms 29 for actuating the forming mechanisms in a predetermined timed sequence of steps to form the articles of glassware. The valves in the valve block 28 are actuated by solenoids (not shown) which are controlled by signals generated by the ISC 24 in accordance with the control programs and timing data which are currently stored in the ISC. The valve block 28 and the glassware forming mechanisms 29 together comprise the individual section 25.

There is also shown in FIG. 4 a blank sensor 31 which generates a signal upon the detection of a gob at the mold in an individual section. The blank sensor 31 includes a blank detector circuit (not shown) for generating the signal to the ISC 24 which signal is utilized to adjust the timing of that individual section to the presence of the gob rather than to a position related distribution time as was done in the prior art. The blank sensor 31 and the blank detector circuit are the subject matter of U.S. patent application Ser. No. 856,473 in the name of Homer F. Peters and assigned to the assignee of the present invention.

A section operator console (SOC) 32 is connected to the ISC 24 and the valve block 28 and is used by the operator to make adjustments to the mechanism timing. The actuation of a particular valve may be either advanced or retarded by the operator with the use of the SOC 32. The SOC 32 may also be used to vary the section offset value and the reject synchronization value as will be discussed. The SOC 32 can be provided with a display (not shown) which enables the operator to check the current timing value for a particular machine function.

The SOC 32 is also used to control the operating condition of the individual section. When the individual section is on, it is designated to be in the "run" condition and, when the section is off, it is designated to be in the "safe" condition. If the section is in the safe condition, the operator can switch to a manual mode wherein the solenoids of the valve block 28 can be individually controlled by a plurality of switches (not shown) which are provided in the SOC 32.

Although the SOC 32 is provided with start and stop controls, the SOC 32 is located on one side of the machine and is only easily accessible to the operator when the operator is on that side. A remote start and stop station 33 is provided and is typically mounted on the side opposite the corresponding SOC. Thus, the start and stop controls are easily accessible to the operator from both sides of the machine.

A bottle reject control panel 34 includes a plurality of switches (not shown) each of which corresponds to a particular cavity of the mold in each individual section. If an operator desires to reject a particular article of glassware, he actuates the corresponding switch on the panel 34. The MSC 22 periodically scans the panel 34 to see if any switches have been actuated. When the MSC 22 senses an actuated switch, the MSC will compare the reject synchronization value corresponding to the section of the rejected glassware with the current machine position. If these two values are equal, a reject control signal will be supplied to a bottle reject station 35 such that the appropriate bottle(s) will be rejected.

As was previously discussed with respect to the valve timing, the operator can utilize the SOC 32 to adjust the reject synchronization value for the individual section such that a glassware article from a selected cavity of the mold in rejected when it arrives at the reject station 35. The reject synchronization value is stored in the ISC as a position in the machine cycle. At a predetermined interval, typically every one minute, the MSC reads the reject synchronization values from the ISC's and stores them. Each time there is a one degree change in machine position, the MSC compares the new machine position with the reject synchronization values and generates the reject signal when they correspond.

Communications between the ISC 24 and the MSC 22 and between the MSC 22 and the I/O device 25 can be achieved utilizing model DLV11 serial input/output interface boards (not shown). Input and output control for the ISC 24 to the SOC 32 and the valve block 28 and for the MSC 22 to the control panel 34 and the reject station 35 can be provided by utilizing model DRV11 parallel input/output interface boards (not shown) If a floppy disk drive is used as the data storage device 27, an RXV11 floppy drive controller (not shown) can be used to control data transfers between the MSC and the floppy disk drive. The DLV11, DRV11 and RXV11 are all manufactured by the Digital Equipment Corporation of Maynard, Massachusetts.

As previously mentioned, the machine supervisory computer 22 and the individual section computer 24 can be LSI-11 computers. This particular type of computer features hardware interrupts. As will be discussed, other features of this computer are an automatic power failure restart and user control of external task scheduling.

There are shown in FIGS. 5 through 9 simplified flow diagrams of programs utilized in the operation of the machine supervisory computer (MSC) 22. As shown in FIG. 4, the MSC is connected to an input/output device 26 which can be a teleprinter having a keyboard input and a printer output and to a data storage device 27 which can be floppy disk drive. The storage device stores on floppy disks both system data, such as control programs, and job histories which include the timing data for forming each type of glassware article. The MSC 22 can be loaded with various "keyboard" programs from the data storage device 27 which programs allow the machine operator to install, change, list or delete a job history in the storage device or to list a directory of all job histories stored or to transfer a job history(s) from one floppy disk to another; to set up the machine parameters for a new job; to load a job history into the ISC's from the storage device; to save an active job history by loading it from an ISC into the storage device; to reload an ISC with a control program and timing data from any other ISC or with a test pattern; to display cavity rate and machine speed; and to display or change the number of cycles in which glassware articles are rejected.

Figure 5:
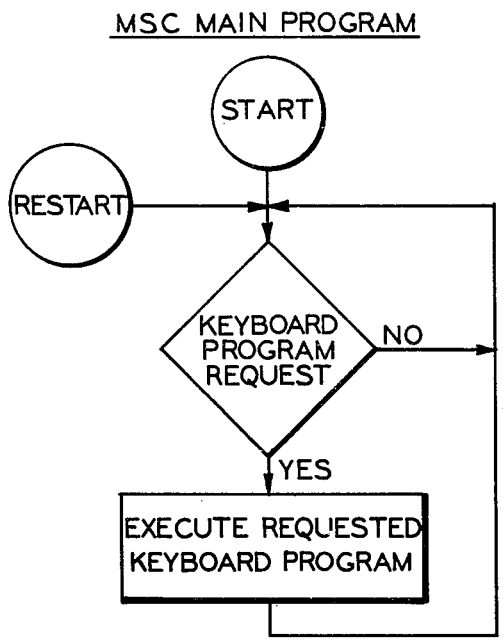
FIGS. 5 through 10 are simplified flow diagrams which are representative of a portion of the programs run by the master supervisory computer of FIG. 4.
Figure 6:
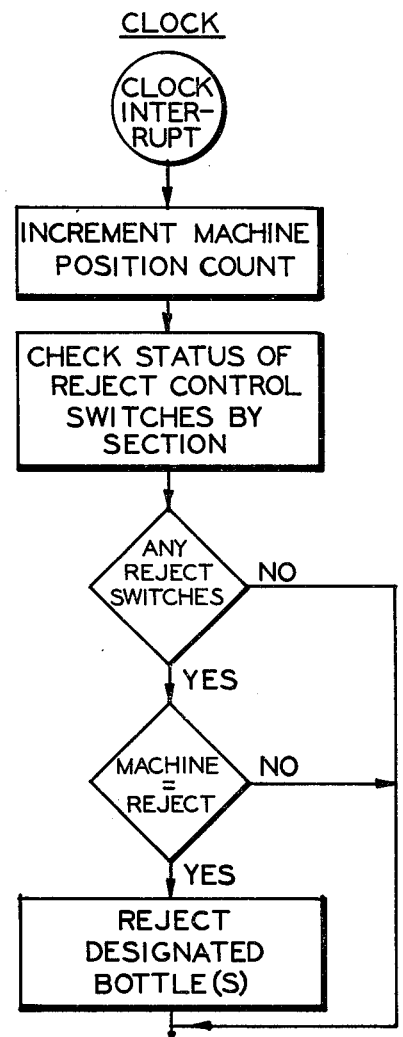

The main program for the MSC 22 is shown in the flow diagram of FIG. 5. The program is initiated at a circle "START" and immediately enters a decision point "KEYBOARD PROGRAM REQUEST" to check for any request to run a keyboard program that may have been entered by the machine operator. If there is such a request, the program branches at "YES" to a processing point. The processing point "EXECUTE REQUESTED KEYBOARD PROGRAM" represents a set of instructions directing the MSC to execute the requested program. The program then returns to the beginning of the main program. If there is no keyboard program request, the main program branches from the decision point at "NO" and returns to the beginning of the program. It should be noted that all of the keyboard programs run on the lowest priority and can be interrupted by any of the programs which are shown in FIGS. 6 through 10.

In addition to the keyboard programs initiated with the input/output device 26, the MSC 22 is also responsible for running other programs all of which have a higher priority than the keyboard programs. A clock interrupt program has the highest priority and is shown in the flow diagram of FIG. 6. A clock interrupt is generated each time a timing pulse is received by the MSC 22 from the timing pulse generator 23. If the MSC is running a keyboard program when the clock interrupt is generated, the keyboard program is interrupted and the clock interrupt is serviced before returning to the keyboard program. The clock interrupt program is initiated at a circle labeled "CLOCK INTERRUPT" and then enters a processing point "INCREMENT MACHINE POSITION COUNT" to update a count total representing the position of the machine in the machine cycle. Next, the program enters a processing point "CHECK STATUS OF REJECT CONTROL SWITCHES BY SECTION" which includes instructions for checking the status of the reject control switches on the reject control panel 34 of FIG. 4 by section. The program enters a decision point "ANY REJECT SWITCHES" to determine if any bottles have been designated for rejection. If any of the reject control switches are actuated, the program branches at "YES" to a decision point "MACHINE = REJECT" wherein the MSC 22 compares the current machine position count total with the reject synchronization value for each individual section. If they are equal, the program branches at "YES" to a processing point "REJECT DESIGNATED BOTTLE(S)" which includes instructions for generating a reject signal to the bottle reject station 35 of FIG. 4 such that the designated bottle will be rejected. The clock interrupt program then returns to the main program at the point the main program was interrupted as is the case when the program branches at "NO" from the "ANY REJECT SWITCHES" decision point when no switches are actuated or when the program branches at "NO" from the "MACHINE = REJECT" dicision point when the machine position count total is not equal to the reject synchronization value.

Figure 7:
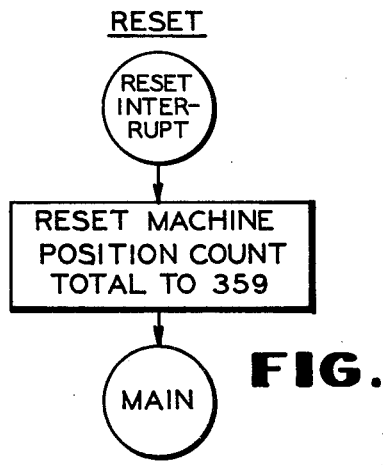

A reset interrupt program has the second highest priority and is shown in FIG. 7. Each time a reset pulse is generated by the timing pulse generator 23, the reset program is initiated at a circle "RESET INTERRUPT". The program enters in processing function "RESET MACHINE POSITION COUNT TOTAL TO 359" which includes instructions for resetting the machine position counter count total at the end of each machine cycle. The reset interrupt program then returns to the main program at the point it was interrupted. The next iming pulse will then set the counter to zero and 359 more timing pulses are counted to complete the machine cycle. As the counter accumulates the last timing pulse, the reset pulse is again generated to correct any error which may have occurred in the machine position count total.

As was previously discussed, the operator can change the section timing data utilizing the SOC 32. Approximately every five minutes, the MSC 22 executes a store program shown in FIG. 8 to update the current section timing data for each individual section which is stored on a floppy disk in the data storage device 27. Thus, if the operator has changed the timing data for a section by advancing or retarding the actuation of a valve, that timing change will be stored in the data storage device 27 within no more than five minutes. The LSI-11 computer is provided with a control over external task scheduling. For example, the operator can schedule a program to run at an absolute time of the day, a delta time from a clock unit synchronization or every so many units of time, such as five minutes. Thus, every five minutes, the store program is initiated at a circle "DATA UPDATE INTERRUPT" and enters a processing function "OBTAIN TIMING DATA FROM ISC AND PLACE IN DATA STORAGE DEVICE". After the current timing data has been stored, the program returns to the main program.

Figure 9:
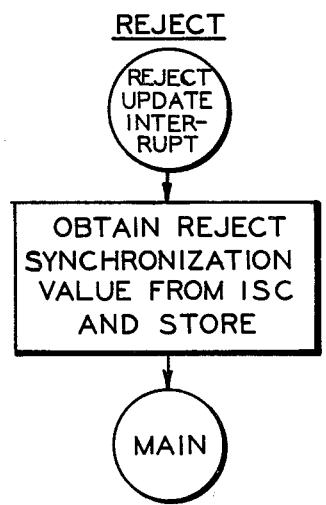

There is shown in FIG. 9 a reject program that is executed by the MSC approximately every one minute to update the reject synchronization values. Thus, if the operator has changed any of these values to achieve a more accurate reject, the change will be stored by the MSC within no more than one minute. The reject program is initiated at a circle "REJECT UPDATE INTERRUPT" and enters a processing function "OBTAIN REJECT SYNCHRONIZATION VALUE FROM ISC AND STORE" which includes instructions for reading and storing the current reject synchronization values for each ISC. The reject program then returns to the main program. The stored values are utilized in the comparison with the machine position performed at the decision point "MACHINE = REJECT" of FIG. 6.

Figure 10:
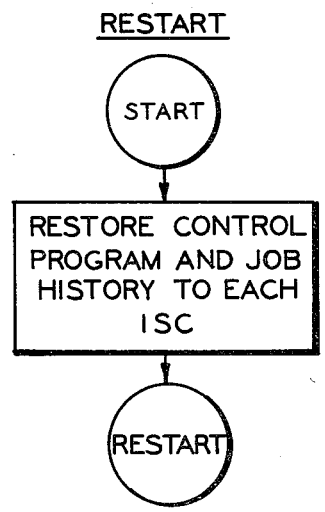

If a power failure occurs, the volatile register contents of the MSC and the ISCs will be lost. There is shown in FIG. 10 a flow diagram which indicates the steps taken by the MSC after a power failure recovery. If the MSC is a LSI-11, it can be programmed to execute a restart program which is initiated at a circle "START". Next a process function "RESTORE CONTROL PROGRAM AND JOB HISTORY TO EACH ISC" restores the ISC memory with the control programs and timing data with which they were loaded before the power failure. There the restart program returns to the main program.

Figure 11:
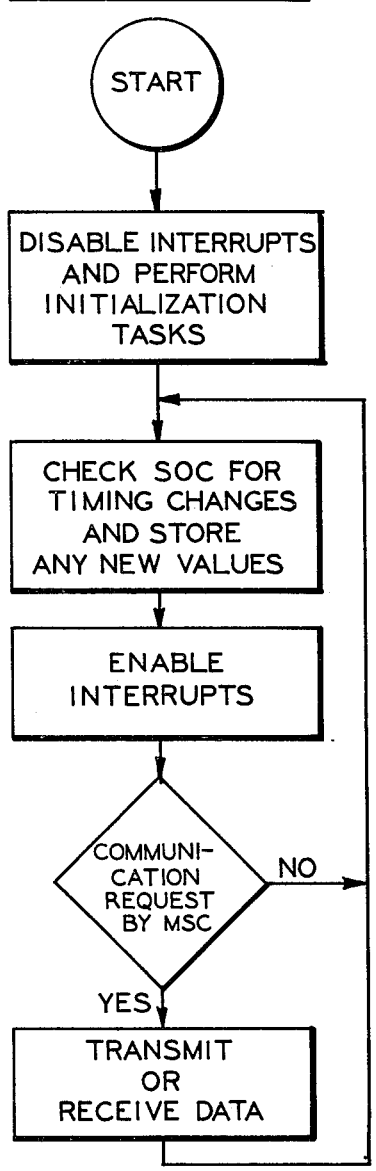
FIGS. 11 through 13 are simplified flow diagrams which are representative of a portion of the programs run by the individual section computer of FIG. 4.
Figure 13:
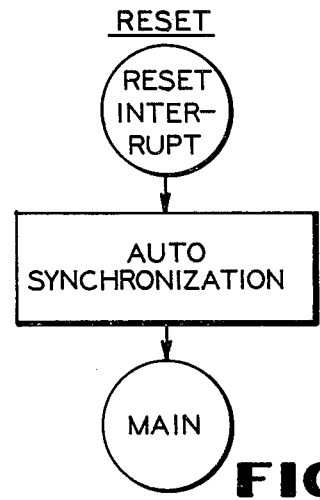
Figure 12:
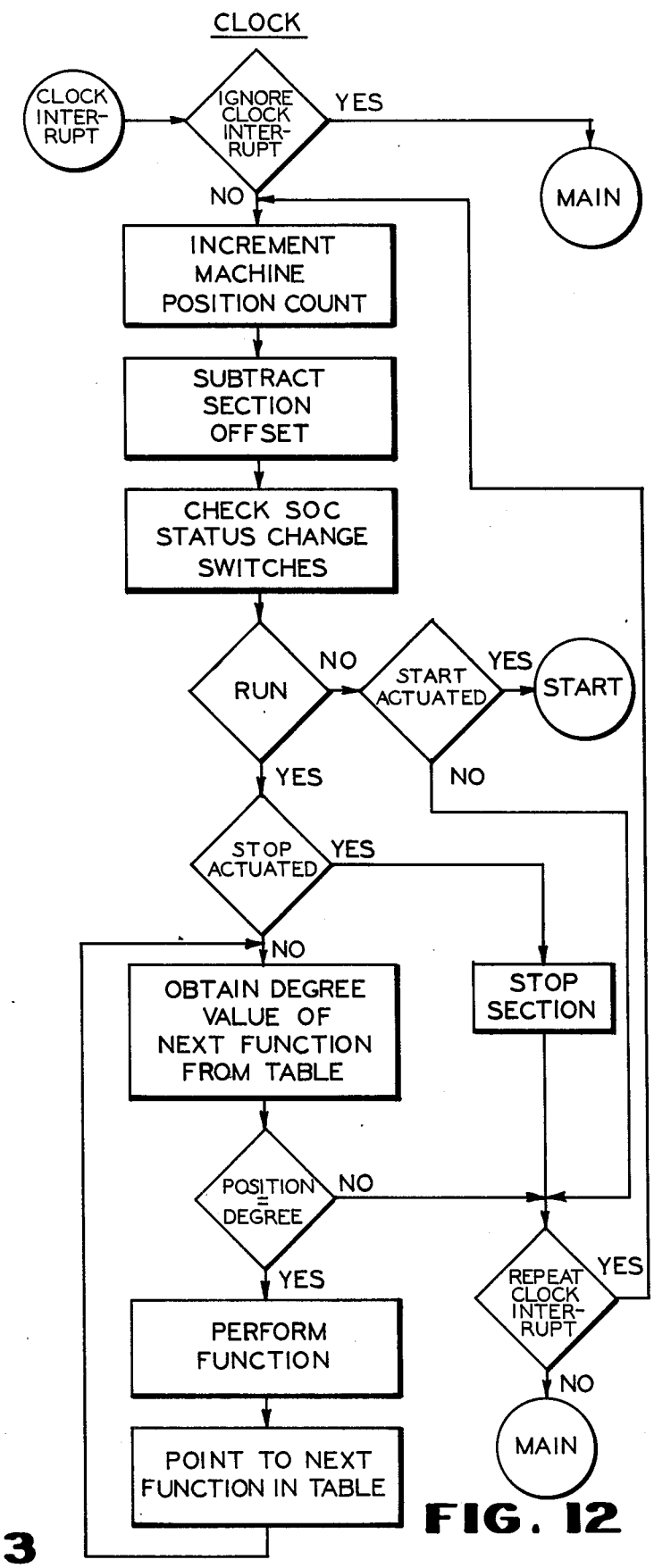

There are shown in FIGS. 11 through 13 flow diagrams which are representative of the operation of an ISC. The main program is shown in FIG. 11. After the ISC memory has been restored by the MSC, the ISC performs several control program initialization tasks such as setting the machine position counter to 359.

Figure 8:
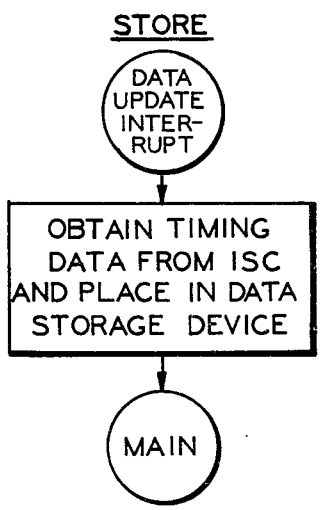

The main program is initiated at a circle "START" and enters a processing function "DISABLE INTERRUPTS AND PERFORM INITIALIZATION TASKS". Next, the program enters a processing function "CHECK SOC FOR TIMING CHANGES AND STORE ANY NEW VALUES" which includes instructions for checking the SOC 32 to determine if the operator has requested a change in the timing data, the section offset value or the reject synchronization value. Any requested changes are stored in the ISC memory to be sent through the MSC to the data storage device when the store program of FIG. 8 is executed by the MSC.

Next, the ISC main program enters a processing function "ENABLE INTERRUPTS" which includes instructions to enable the ISC to respond to the timing and reset pulses generated by the timing pulse generator 23. The program then enters a decision point "COMMUNICATION REQUEST BY MSC". If the MSC has requested to either transmit data to or receive data from the ISC, the program branches at "YES" to a processing function "TRANSMIT OR RECEIVE DATA" which includes the required instructions for communication between the MSC and the ISC. The program then returns to the processing function "CHECK SOC FOR TIMING CHANGES AND STORE ANY NEW VALUES" and continues to loop. If the MSC has not requested communication, the program branches from the decision point "COMMUNICATION REQUEST BY MSC" at "NO" to retrun to the processing function "CHECK SOC . . . . ".

There is shown in FIG. 12 a flow diagram of the clock interrupt program for the ISC. Each time a timing pulse is received from the timing pulse generator 23 and the main program has enabled the clock and reset interrupts, the ISC initiates a clock interrupt since the clock interrupt program has a higher priority. The clock interrupt program is initiated at a circle "CLOCK INTERRUPT" and enters a decision point "IGNORE INTERRUPT" which checks for a direction to ignore the clock interrupt. As will be discussed below, a late occurring reset pulse will require that at least one clock interrupt be ignored such that the program branches at "YES" and returns to the main program. If the clock interrupt is not to be ignored, the program branches at "NO" and enters a processing function "INCREMENT MACHINE POSITION COUNT" which includes instructions for updating a count total representing the position of the machine in the machine cycle. As discussed above, this count total is conveniently zero to 359 representing 360 degrees in a machine cycle. This corresponds to one rotation of the prior art timing drum which utilized cams to operate the values which actuated the glassware forming means, the position of the cams being defined in degrees. Next, the program enters a processing function "SUBTRACT SECTION OFFSET" which includes instructions for substracting the section offset value, if any, from the machine position count total to obtain a count total representing the instantaneous position of the individual section in the machine cycle which count total is stored.

Next, the program enters a processing function "CHECK SOC STATUS CHANGE SWITCHES" which includes instructions for checking the status of the start and stop switches on the SOC 32 and the remote panel 33 to determine if the operator has requested a change in the status of the machine. The program enters a decision point "RUN" to check if the section is in the run condition forming glassware articles. If the section is not running, the program branches at "NO" to a decision point "START ACTUATED" to check whether either of the start switches has been actuated as determined by the "CHECK SOC STATUS CHANGE SWTICHES" processing function. If neither start switch has been actuated, the clock interrupt program branches at "NO" to a decision point "REPEAT CLOCK INTERRUPT". As will be discussed below, an early occurring reset pulse will require at least one extra clock interrupt such that the program branches at "YES" back to the "INCREMENT MACHINE POSITION COUNT" processing function. If the clock interrupt is not to be repeated, the program branches at "NO" to return to the main program to await the next timing pulse. If either start switch has been actuated, the program branches at "YES" back to the "START" circle of the main program to start the section.

If the section is running, the program branches from "RUN" at "YES" to a decision point "STOP ACTUATED" to check whether either of the stop switches has been actuated as determined by the "CHECK SOC STATUS CHANGE SWITCHES" processing function. If either stop switch has been actuated, the program branches at "YES" to a processing function "STOP SECTION" which includes instructions for stopping the operation of the section. The clock interrupt program then enters the "REPEAT CLOCK INTERRUPT" decision point. If neither stop switch has been actuated, the program branches at "NO" to a processing function "OBTAIN DEGREE VALUE OF NEXT FUNCTION FROM TABLE" which includes instructions for looking up the degree value of the next glassware forming function to be performed in a table wherein the forming functions are listed in the order they are to be performed in the forming cycle. The program then enters a decision point "POSITION = DEGREE" wherein the instantaneous position count total for the section is compared with the degree value of the next function to be performed. If the values are not equal, the program branches at "NO" to enter the "REPEAT CLOCK INTERRUPT" decision point. If the values are equal, the program branches at "YES" and enters a processing function "PERFORM FUNCTION" which includes instructions for generating a control signal to the solenoid for actuating the proper valve in the valve block 28. Next, the program enters a processing function "POINT TO NEXT FUNCTION IN TABLE" which includes instructions for shifting to the next function listed in the table such that the degree value for this function is obtained as the program returns to the "OBTAIN DEGREE VALUE OR NEXT FUNCTION FROM TABLE" processing function. Thus, the program will perform all functions having the same degree value before returning to the main program.

A reset interrupt program is shown in FIG. 13. Each time the timing pulse generator 23 generates a reset pulse and the main program has enabled the clock and reset interrupts, the ISC initiates a reset interrupt program which is intitiated at a circle "RESET INTERRUPT". The program then enters a processing function "AUTOSYNCHRONIZATION" which includes instructions for checking to see if the reset pulse occurred between 359° and 0° of the section cycle and, if it did so occur, no further action is required. If the reset pulse occurred within a range, for example, 357° through 2°, instructions are executed to modify the count of the clock pulses. If the reset pulse was early, on the next clock interrupt the clock interrupt program is cycled as many times as are required to increment the clock pulse count total to place the section in synchronization. If the reset pulse was late, the clock interrupt is ignored as many times as are required to maintain the clock pulse count total to place the section in synchronization. In any of these instances, the reset interrupt program then returns to the main program. If the reset pulse occurs outside of the range, an emergency stop is initiated. The reset interrupt is lower than the clock interrupt in priority.

There is also a line frequency interrupt program which is similar to the reset interrupt program of FIG. 13. An interrupt is generated by each cycle of the alternating current power source for the ISC. Every predetermined number of cycles, the line frequency interrupt program checks the clock pulse count total to determine whether it has been incremented since the last such check. If the clock pulse count total has not been incremented for a predetermined number of the checks, an emergency stop is initiated.

In summary, the present invention concerns a glassware forming machine having means for forming gobs of molten glass, a plurality of individual glassware forming sections, means for feeding the gobs of molten glass to the individual sections, glassware forming means in each of the individual sections for forming glassware articles from the gobs of molten glass in a series of predetermined forming steps in response to a plurality of control signals and control means for generating the control signals. The control means includes a means, such as a floppy disk, for storing a control program defining the series of predetermined forming steps and section timing data for the forming steps of each individual section; a plurality of section control means, such as LSI-11 digital computers, individual to each of the individual sections for generating the control signals to the glassware forming means in accordance with the control program and the timing data; and a machine supervisory control means, such as a LSI-11 digital computer, connected between the storage means and each of the section control means for loading the control program and the section timing data into the section control means and for reading the current value of the section timing data from the section control means at predetermined intervals and storing the current section timing data in the storage means.

The glassware forming machine also includes a means for generating a train of timing pulses at a frequency proportional to the rate of forming the glassware such that a predetermined number of the timing pulses represents a glassware forming cycle of the machine. Each of the section control means is responsive to the timing pulse train for accumulating a count total of the timing pulses representing the instantaneous position of the individual section in the machine cycle, the section control means comparing the timing pulse count total with the timing data for the next forming step in the series and generating one of the plurality of control signals when the timing pulse count total and the timing data match. The glassware forming cycles of the individual sections are offset from one another. Each of the section control means subtracts a different predetermined offset count from the timing pulse count total to obtain the count representing the instantaneous position of the individual section in the machine cycle, the section control means comparing the instantaneous position count with the timing data of the next forming step in the series.

The disclosed invention also concerns a control system for a cyclically operated machine having at least first and second stations each of which are responsive to control signals to operate in regular cycles including like series of predetermined steps and in which corresponding steps for the first and second stations are offset in time with respect to each other. The control means includes a means for storing a control program defining the series of predetermined steps and for storing timing data for the step, a first and second control means individual respectively to each of the first and second stations for generating the control signals for the steps performed by the respective first and second stations in accordance with the control program and the timing data and a machine supervisory control means connected between the storage means and each of the first and second control means for loading the control program and the timing data into the first and second control means.

The storage means can be the data storage device 27 which has a pair of floppy disks. The system floppy disk stores programs for the machine supervisory control means or computer 22, the control program for the first and second control means or individual section computers and the current value of the timing data which is updated every five minutes. The job history floppy disk has stored on it the timing data for a plurality of jobs. A predetermined call out means or clocking means in the machine supervisory control means initiates the store program of FIG. 8 such that the current value of the timing data is read from the first and second control means and is loaded into the volatile memory of the machine supervisory control means as well as the system floppy disk. The current value of the timing data can also be loaded into the job history floppy disk to replace the timing data which was stored and was loaded into the first and second control means initially in response to a save signal which initiates a machine supervisory control means keyboard program.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. In a glassware forming machine having means for forming gobs of molten glass, a plurality of individual glassware forming sections, means for feeding the gobs of molten glass to the individual sections, glassware forming means in each of the individual sections for forming glassware articles from the gobs of molten glass in a series of predetermined forming steps in response to a plurality of control signals, and control means for generating the control signals, the control means comprising:

first means for storing a control program defining the series of predetermined forming steps and for storing section timing data for the forming steps of each individual section;

a plurality of section control means individual to each of the individual sections for generating the control signals to the glassware forming means in accordance with said control program and said section timing data, each of said section control means including a second means for storing said control program and said section timing data; and a machine supervisory control means connected between said first storage means and each of said section control second storage means for loading said control program and said section timing data into said section control second storage means and for reading the current value of said section timing data from said section control section storage means at predetermined intervals and storing said current section timing data in said first storage means.

2. A control means according to claim 1 wherein said first storage means includes a floppy disk for storing said control program and said section timing data.

3. A control means according to claim 1 wherein said machine supervisory control means and each of said section control means are digital computers.

4. A control means according to claim 1 wherein each of said section control second storage means stores the current values of said section timing data for the individual glassware forming section being controlled by said section control means, said machine supervisory control means generates command signals to each of said section control means at said predetermined intervals, and each of said section control means generates said current section timing data to said machine supervisory control means in response to said command signals.

5. A control means according to claim 4 wherein said predetermined intervals are approximately five minutes apart.

6. A control means according to claim 1 including a power supply for generating power to at least one of said section control means and wherein said machine supervisory control means is responsive to the restoration of power after a failure of said power supply for loading said control program and said current section timing data into said one section control means second storage means.

7. A control means according to claim 1 wherein the glassware forming machine includes means for generating a train of timing pulses at a frequency proportional to the rate of forming the glassware such that a predetermined number of said timing pulses represents a glassware forming cycle of the machine and wherein each of said section control means is responsive to said timing pulse train for accumulating a count total of said timing pulses representing the instantaneous position of the individual section in the machine cycle, said section control means comparing said timing pulse count total with the timing data for the next forming step in the series and generating one of the plurality of control signals when said timing pulse count total and the timing data correspond.

8. A control means according to claim 7 wherein the timing pulse generating means generates a reset pulse after generating the predetermined number of timing pulses and wherein each of said section control means is responsive to said reset pulse for adjusting said timing pulse count total to synchronize said machine cycle with the generation of said reset pulse.

9. A control means according to claim 8 wherein each of said section control means is responsive to the generation of said reset pulse outside a predetermined range of said timing pulse count total for stopping the generation of the control signals.

10. A control means according to claim 8 wherein each of said section control means is responsive to the non-receipt of a predetermined number of said reset pulses for stopping the generation of the control signals.

11. A control means according to claim 7 including a source of alternating current power for the control means, wherein each of said section control means is responsive to the frequency of said power source for periodically checking said timing pulse count total and for stopping the generation of the control signals when said timing pulse count total has not changed for a predetermined number of said checks.

12. A control means according to claim 11 wherein the glassware forming cycles of the individual sections are offset from one another and wherein each of said section control means subtracts a different predetermined offset count from said timing pulse count total to obtain said count representing the instantaneous position of the individual section in its glassware forming cycle, said section control means comparing said instantaneous position count with the timing data of the next forming step in the series for generating one of the plurality of control signals.

13. A control means according to claim 1 wherein each of said section control means includes means for changing the values of any of said section timing data.

14. A control system for a cyclically operated machine having first and second stations each of which are responsive to control signals to operate in regular cycles including like series of predetermined steps and in which corresponding steps for the first and second stations are offset in time with respect to each other comprising:

first means for storing a control program defining the series of predetermined steps and for storing timing data for the steps;

a first and second control means individual respectively to each of the first and second stations for generating the control signals for the steps performed by the respective first and second stations in accordance with said control program and said timing data, each of said control means including a second means for storing said control program and said timing data; and a machine supervisory control means connected between said first storage means and each of said second storage means for loading said control program and said timing data into said second storage means.

15. A control system according to claim 14 including means for generating a predetermined call out signal wherein said first and second control means include means for changing the value of said timing data and wherein said machine supervisory control means is responsive to said predetermined call out signal for reading the current value of said timing data from one of said first and second control means second storage means.

16. A control system according to claim 15 wherein said predetermined call out signal generating means is a clocking means operating at a predetermined rate.

17. A control system according to claim 16 wherein said machine supervisory control means includes means for storing the called out current value of said timing data.

18. A control system according to claim 17 wherein said first storage means includes means for storing the called out current value of said timing data and said machine supervisory control means is responsive to said call out signal for loading the called out current value of said timing data into said first storage means.

19. A control system according to claim 17 including means for generating a save signal and wherein said machine supervisory control means is responsive to said save signal for replacing said timing data in said first storage means with the current value of said timing data.

* * * * *